C. W. COE.
DRILL.
No. 9,441.  Patented Dec. 7, 1852.
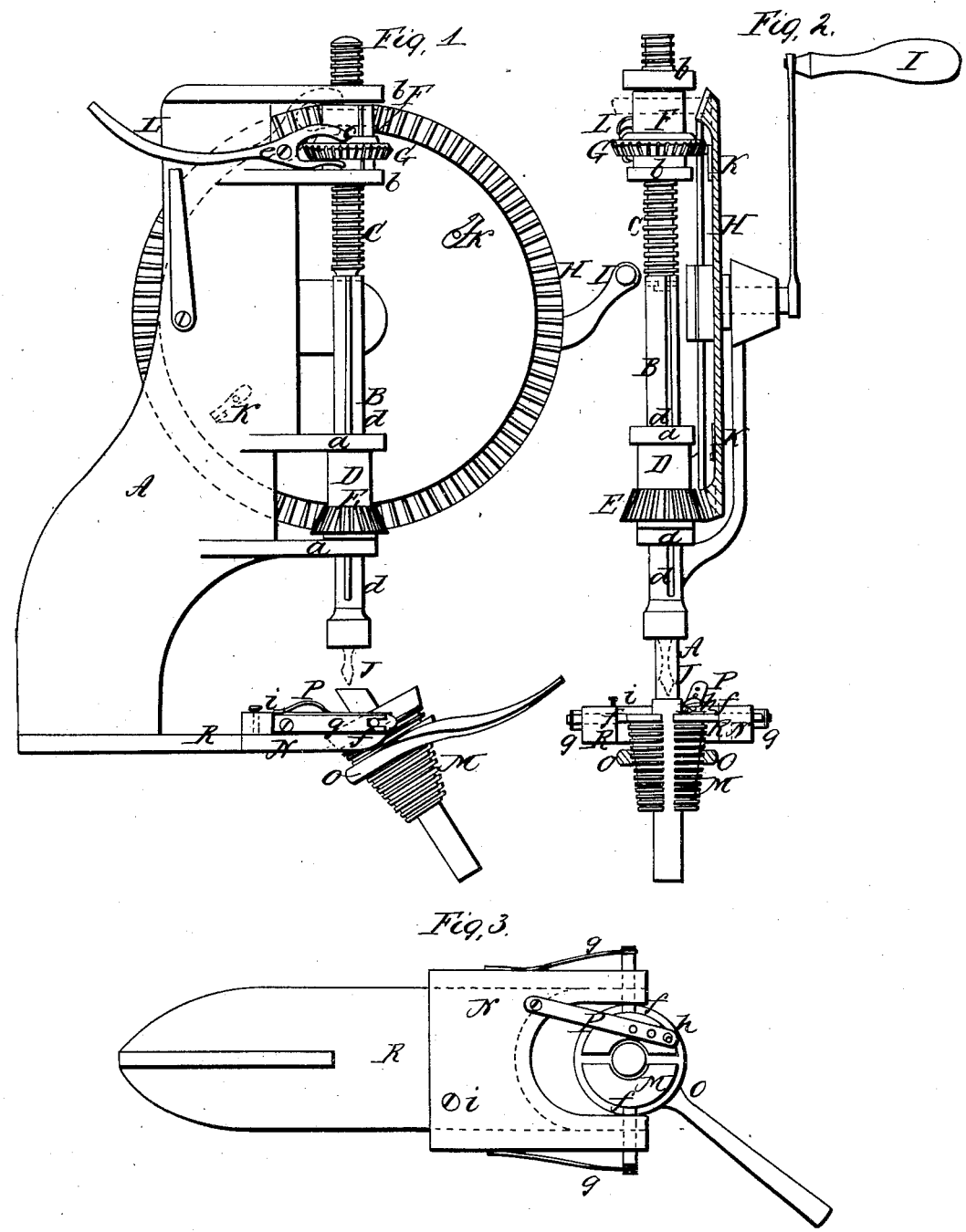

UNITED STATES PATENT OFFICE.

C. W. COE, OF ASHTABULA, OHIO.

DRILLING-MACHINE.

Specification of Letters Patent No. 9,441, dated December 7, 1852.

*To all whom it may concern:*

Be it known that I, C. W. COE, of Ashtabula, in the county of Ashtabula and State of Ohio, have invented certain new and useful Improvements in Machinery for Drilling; and I do hereby declare that the following is a full, clear, and exact description of the construction and operation of the same, reference being had to the annexed drawings, making a part of this specification, in which—

Figure 1 is a side elevation of the drill. Fig. 2, is a front view of ditto, the spur or driving wheel being bisected vertically through its center. Fig. 3, is a plan or top view of the clutch which holds the article to be drilled and the movable bed.

Similar letters of reference indicate corresponding parts in each of the several figures.

The nature of my invention consists:

1st. In a peculiar manner of giving the feed motion to the spindle which holds the drill, and also the manner of giving to the spindle the receding motion by which the drill after it has performed its work is withdrawn from the hole or aperture which it made and made ready to receive again the feed motion. This will be fully described hereafter.

2nd. My invention consists in a peculiar manner of constructing the clutch or vise, viz, by means of a vibrating clutch suspended to a movable bed by which the drill may be made to enter the article at any required angle, and the article be also shifted horizontally to any desired position underneath the drill.

To enable others skilled in the art to make and use my invention, I will proceed to describe its construction and operation.

A, represents a frame or standard to which the working parts are attached, B, is the spindle, which works in bearings (*a*) (*a*) attached to and projecting from the frame or standard A. To the upper part of the spindle B, there is attached a screw C, the lower end of which is secured in the upper end of the spindle B, a groove being around the screw near its lower end and a small pin or pins passing through the spindle and fitting in the groove in the screw, the screw passing a short distance into the top of the spindle, see dotted lines in Figs. 1, and 2, thus the screw is attached to the spindle and at the same time the spindle is allowed to turn independent of it. The screw works in bearings (*b*) (*b*) which projects from the frame or standard A, precisely as the bearings (*a*) (*a*) of the spindle.

Between the bearings (*a*) (*a*) of the spindle B, and encompassing the spindle there is a collar D, having upon it a pinion E, attached permanently to it. The collar D, is secured to the spindle by means of a feather and groove which cause the spindle to turn with the pinion E, and at the same time allows the spindle to be moved reciprocally in the direction of its axis while rotating this groove is designated by (*d*) and is seen in Figs. 1. and 2. Between the bearings (*b*) (*b*) of the screw C, and encompassing the screw there is a collar F, which has a female screw cut in its inner side the collar fitting and working on the screw similar to a nut. On this collar F, there is placed loosely a pinion G, attached by means of a feather and groove which allow the pinion G, to be moved on the collar F. This groove designated by (*c*) is seen in Fig. 1.

H, is the spur or driving wheel having the bearings of its axis attached to the frame or standard in any proper manner. I, is the crank of the wheel H. The wheel H, meshes into the pinion E, and as the wheel H, is turned a rotary motion is given the spindle and drill. The drill being represented by J, see dotted lines in Figs. 1 and 2.

K, K, are two lugs or dogs attached to the inner side of the spur or driving wheel H. These dogs as the wheel H, is turned act upon the pinion G, when the pinion is at the lower end of the collar F, and consequently turn the collar F, a certain distance every time they pass the pinion. The collar F, in turning forces down the screw C, and spindle B, it being understood that the collar F, acts precisely like a nut in consequence of its female screw fitting and working over the male screw C. There may be more than two dogs if desired. A greater number of dogs producing a more rapid feed motion. The manner of producing the feed motion is extremely simple and from the above description will be readily understood.

L, is a lever having its fulcrum at (*e*) one end of this lever terminates in a fork between the prongs of which a portion of the pinion G, is placed. As this lever is raised or depressed the position of the pinion G, is correspondingly changed. By depressing the outer end of the lever L the pinion G, is elevated on the collar F, till it meshes into the upper part of the spur or driving wheel H, the pinion G, as before stated being placed loosely on the collar F, and secured to it by a feather and groove.

When the pinion G, is elevated as seen by the red lines in Figs. 1, and 2, a reverse motion is given the spur or driving wheel H, *videlicet*, the wheel being turned toward the operator when in front of the machine, and the spindle and drill is elevated or raised from the work, when the feed motion is communicated to the spindle the outer end of the lever L, is elevated and the pinion G, consequently depressed. The spur or driving wheel H, is then turned from the operator and the dogs K, K, act upon the pinion G, which in turning depresses the spindle and drill.

M, is a clutch suspended to a movable bed N. The clutch is of conical shape and is formed of two equal parts, it being divided vertically through its center. On the outer side of the clutch a screw is cut and a nut O, works on it. An opening passes longitudinally through the center of the clutch and the article to be drilled is placed in this opening and permanently secured thereby operating the nut O. It will be seen that as the nut O, is screwed upward the two parts of the clutch are brought nearer together owing to its conical form and consequently they are made to bind firmly the article in the center of the clutch. The clutch has two arms (*f*) (*f*) at opposite points on its upper part, said arms passing through the fronts of the sides of the movable bed N. A groove is cut at the end of each arm in which grooves the ends of springs (*g*) (*g*) fit, see Fig. 3. These springs are for the purpose of spreading the two parts of the clutch from each other as the nut O, is screwed down and thus allow the article within the clutch to be withdrawn from it.

The arms (*f*) (*f*) fitting in the movable bed as shown, allow the clutch to be turned in an oblique position and at any given angle, the clutch being secured at any angle by means of a spring plate P, which has apertures through its outer end through either of which apertures a pin (*h*) on the upper part of the clutch may pass see Figs. 2, and 3.

The movable bed slides over the bar R, of the frame or standard A, and a set screw (*i*) secures it in any desired point.

Thus it will be seen that the article to be drilled may be placed vertically or obliquely under the drill and also horizontally adjusted as desired by properly operating the movable bed N.

Having thus described the nature and operation of my invention, what I claim as new and desire to secure by Letters Patent, is—

1. The peculiar manner of giving the slow automatic feed motion to the spindle and the fast receding motion by means of the sliding pinion G, collar F, and screw C, which is attached to the spindle B, combined with the two sets of cogs or their equivalents upon the face of the same disk, the several parts above named being constructed, arranged and operating in the manner and for the purpose as herein shown and described.

2. I claim the peculiar method of constructing and arranging the clutch M, as herein shown and described by which the inclination of the clutch may be changed as desired and the position of the clutch also moved or changed bodily in a horizontal direction.

CHARLES W. COE.

Witnesses:
 A. E. H. JOHNSON,
 S. W. WOOD.